United States Patent [19]
Thacher et al.

[11] Patent Number: 5,917,725
[45] Date of Patent: *Jun. 29, 1999

[54] TOURNAMENT DATA SYSTEM

[75] Inventors: Kerry E. Thacher, Winnipeg; Gary H. Sumka, Oakville; Mohamed A. Barakat, Winnipeg; John S. Hancharyk, Winnipeg; John A. Klayh, Winnipeg, all of Canada

[73] Assignee: John Klayh, Manitoba, Canada

[ * ] Notice: This patent is subject to a terminal disclaimer.

[21] Appl. No.: 08/449,693

[22] Filed: May 24, 1995

Related U.S. Application Data

[63] Continuation of application No. 08/144,499, Nov. 2, 1993, abandoned, which is a continuation of application No. 07/799,084, Oct. 18, 1991, abandoned, which is a continuation of application No. 07/228,847, Aug. 3, 1988, Pat. No. 5,083,271, which is a continuation of application No. 06/749,311, Jun. 26, 1985, abandoned.

[30] Foreign Application Priority Data

Jun. 27, 1984 [CA] Canada ..................................... 457628

[51] Int. Cl.⁶ .................................................. G06F 17/161
[52] U.S. Cl. .................................. 364/410.1; 340/323 R; 340/825.54; 364/411.1; 463/29; 463/40; 463/42
[58] Field of Search ............................ 273/DIG. 28, 1 E, 273/138 A, 85 G, DIG. 26; 340/323 R, 825.54; 364/410, 411, 400, 410.1, 411.1; 463/1, 40, 41, 42, 30, 31, 29, 47

[56] References Cited

U.S. PATENT DOCUMENTS

| | | | |
|---|---|---|---|
| 3,534,337 | 10/1970 | Martin et al. | 702/188 |
| 3,541,513 | 11/1970 | Paterson | 340/825.54 |
| 4,072,930 | 2/1978 | Lucero et al. | 463/47 |
| 4,302,010 | 11/1981 | Kaenel | 473/70 |
| 4,319,131 | 3/1982 | McGeary et al. | 235/375 |
| 4,367,526 | 1/1983 | McGeary et al. | 377/5 |
| 4,570,930 | 2/1986 | Matheson | 463/41 |
| 4,575,622 | 3/1986 | Pellegrini | 463/25 |
| 4,646,172 | 2/1987 | Lemelson | 360/33.1 |
| 4,652,998 | 3/1987 | Koza et al. | 463/26 |
| 5,083,271 | 1/1992 | Thacher et al. | 364/411.1 |
| 5,674,128 | 10/1997 | Holch et al. | 463/42 |
| 5,683,082 | 11/1997 | Takemoto et al. | 273/121 B |
| 5,685,775 | 11/1997 | Bakoglu et al. | 463/41 |
| 5,702,305 | 12/1997 | Norman et al. | 463/42 |
| 5,812,049 | 9/1998 | Uzi | 340/323 R |
| 5,813,913 | 9/1998 | Berner et al. | 463/40 |
| 5,816,920 | 10/1998 | Hanai | 463/42 |
| 5,820,459 | 10/1998 | Acres et al. | 463/42 |
| 5,833,540 | 11/1998 | Miodunski et al. | 463/25 |

OTHER PUBLICATIONS

Retailing Home Furnishing, vol. 57, pp. 1–2, "AT&T, Coleco eye games by phone", Sep. 12, 1983.

*Primary Examiner*—Edward R. Cosimano
*Attorney, Agent, or Firm*—Antonelli, Terry, Stout & Kraus, LLP

[57] ABSTRACT

A tournament system for electronic games in which scores achieved on the games are transmitted to one or a hierarchy of computers in which a winner is determined. At least one computer stores a player code associated with player credits. The players insert credit cards into the games which read the player codes, send the codes to a computer, obtain verification signals from the computer and are thereby enabled. The computer also stores handicap values associated with players and/or the games, and modifies the scores by the handicap values. The computer can also download advertising, winner or other messages to specific ones or all the games for display, and can cause the games played to be modified or changed.

66 Claims, 3 Drawing Sheets

TOURNAMENT DATA SYSTEM

This is a continuation of U.S. Ser. No. 08/144,499, filed Nov. 2, 1993, now abandoned, which is a continuation of U.S. Ser. No. 07/779,084, filed Oct. 18, 1991, now abandoned, which is a continuation of U.S. Ser. No. 07/228,847, filed Aug. 3, 1988, now U.S. Pat. No. 5,083,271, which is a continuation of U.S. Ser. No. 06/749,311, filed Jun. 26, 1995, now abandoned.

FIELD OF THE INVENTION

This invention relates to games of skill, and in particular to a system in which players of individual electronic games such as video games or the like can play a tournament.

BACKGROUND OF THE INVENTION

In a tournament, various participants compete individually or in teams to determine which participant or team has the most skill at separate games. The degree of skill is usually evident by points scored, and in some games, handicaps can be accorded according to the proficiency of the players and/or the difficulty of the games. Until now, however, it was not reasonably possible to allow players of different kinds of games to enter the same tournament. As one of the advantages of the present invention, such a tournament is facilitated. In addition, individual player handicaps can be automatically stored and taken into account, and winners automatically declared and announced.

There have been in the past certain kinds of games which facilitated electronic reporting of scores to a central location, allowing a central manager to allocate prizes, as for example described in U.S. Pat. No. 4,302,010 issued Nov. 24th, 1981 to AMF Incorporated, which relates to an electronic bowling scoring system. However this system is restricted to use in a single bowling hall, in which the veracity of play of all of the bowlers can be observed by other participants in the bowling hall or on the team. However the system cannot be used where doubt exists who the actual player is. For example if a person has a private bowling alley with a score entry terminal connected to the system described in the aforenoted U.S. patent, it would not be possible to ensure that the person who is signed up to play the game in the tournament is actually playing, and therefore false score data could be entered. In addition, scores are entered into the score entry terminal manually, which also allows the possibility of cheating. While this of course would be unsportsmanlike, it could become very serious if a valuable prize is to be awarded for high score.

Due to the above and other problems, it has not been possible until now to provide large scale tournament playing with very diverse player locations. The present invention provides means for ensuring with a high degree of security that the person achieving the score is the assumed person who is playing.

SUMMARY OF THE INVENTION

The present invention, further provides for the first time a tournament system in which people of widely varying skills can play different kinds of games of skill at diverse locations while participating in the tournament. The games can be grouped centrally, can be single games scattered at various locations, and all can be played in a tournament which is localized, regionalized, national in scope or, indeed, worldwide. Such tournaments can be established with single expert players, national teams, etc., with a high degree of reliability that any person achieving an indicated score is the actual person assumed to be playing in the game. Furthermore, as players achieve greater skill, or change the games which they play, their achievement levels, which can be reflected in handicaps, can be stored and applied to games played as the player chooses to play games in different locations, even though the locations can be anywhere the games are situated assuming that they are connectable to the system described herein.

The various games which can be utilized in the tournament system described herein are microprocessor based and which transmit their scores, usually to an electronically operated display, via an internal bus. Such games include various kinds of video games, microprocessor operated pinball machines, home computer video games, or the like. It is further intended that other skill based units which outputs a score or equivalent signal, such as certain kinds of exercise machines should be considered to be games of skill in this specification.

Such games which are utilizable for the present invention transmit their score data signals to a local display and transmit their control data signals via the aforenoted bus. In the present invention a universal interface apparatus connects to the bus, the interface circuit containing a microprocessor and local memory. Data signals from the game (which will be referred to herein generically as video game, although the invention is not restricted to commercial video games as such) is mirrored and stored in the interface memory. Software or firmware in the interface circuit selects specific locations in the interface memory where the score data relating to the local video game is stored, and this data is transmitted to a central computer via a local area network, telephone line, or other data link upon polling or upon other means of access by the central computer.

A large number of such video games can be connected to the local area network area or via various data links to the central computer, each being polled or otherwise accessed at times selectable by the central computer, for transmission and storage of achieved scores.

Since each game is self-contained, obviously each game would end at a different time from the others. The central computer stores the score which is achieved for comparison with other scores at a predetermined time, in combination with an unique code which identifies the player, and which is obtained as follows.

Upon desiring to enter a tournament for the first time, a player purchases a credit card from a credit manager. The credit manager transmits signals representing the value of the number of games purchased by the player to the central computer (or alternatively to a credit computer) from a credit terminal, along with a unique code which identifies the player, the code being associated with the credit. These are preferably stored at the central or credit computer but can be stored at a higher level computer or in some cases in another control computer in a network to be described later. The player code is also marked or magnetically encoded on the credit card which is given to the player.

The player then inserts his credit card into a credit card reader of any of the video game machines connected to the system. The card reader reads the card, transmits the player code to the central or credit computer and obtains an indication that the player has credit. If the player has credit, the video game machine is turned on enabling the player to play, and at the same time the credit value at the central computer or credit computer is decremented by one game or the value of one game. At the same time the central computer stores the player's code number associated with a memory allocation for his score. Alternatively, the score can be stored associated with the already stored player code number.

The player plays the video game. At the end of the game, the score is transmitted to the central computer and is stored. Alternatively, the game can be polled and a continuously updated score transmitted to the central computer. As a further alternative, the validated player could enter his score manually on a keyboard associated with the video game.

When the video game is first turned on, it transmits to the central computer, preferably upon polling, a game drop number which identifies the data link drop. The operator then keys in a number identifying the kind of game into a keyboard associated with the interface. The central computer stores the game type number with the drop number on a disk. Alternatively, the game number is entered into the computer at the computer by the operator.

Preferably the computer then downloads a menu which is displayed on the game screen, giving the player several options, such as playing in the tournament, playing a practice game, selecting play of a different game, etc. The player can select the game by using the keypad.

The central computer preferably has previously stored a difficulty handicap associated with each kind of game. If the player had previously played that or some other kind of game, the central computer will have stored difficulty handicaps relating to the different kinds of video games which he might have played. The central computer can also keep track of an individual player's scores associated with any of the games, allocating handicaps as his skill increases by associating and storing all or some of the game number, game handicap, player numbers, previous player's previously achieved handicap and present score.

Since the player has been identified by number, and his number is transmitted to the central computer, with the game identification number, the player and the game are uniquely identified in association with the achieved score. Consequently, except in the unlikely case of theft of the credit card, or collusion between players, it is highly certain that the person assumed to be playing the game is actually playing the game.

In addition, the above system facilitates the inclusion of players in isolated locations such as those who might play a single video game located in a country store remote from an urban area, or in a person's home, of various kinds of games with the skill levels of the various games being different, all playable in a single tournament with players having various degrees of skill. Such a system thus increases the democratization of such tournaments, and assuming that a handicap system is pre-established, allows persons across the world to play tournaments with each other with games of their choice. Further, the interface facilitates automatically changing the kinds of games, use of the game as a terminal such as a data entry terminal, an electronic lottery terminal, etc.

In the smallest system, with a small number of video games, only a single central computer is required. However where the numbers of games increase, many central computers are used, each connected via a local area network or other data links, to a plurality of video games, and each being connected to a further hierarchy of central computers, which themselves can be connected to a further hierarchy of central computers, depending on the desired size of the network.

The highest tier is constituted by a single computer or a group of computers, in which the best scores are compared. Data messages are sent from any of the central computers to lower ranks of computers or to the video games themselves, constituting announcements of winners, of future tournaments, advertisements or other displays.

A preferred embodiment of the invention is an electronic tournament system comprising a plurality of games of skill including apparatus for generating signals representative of the scores resulting from the games, apparatus for displaying the scores locally at the games, computer apparatus for storing player identification data signals and player game credit signals associated with selected player identification data signals, a player identifier reader associated with each of the games for receiving a player identifier, reading the identifier, forwarding a credit enquiry signal associated with the signal identifying the player resulting from reading the identifier to the latter computer, for receiving a credit verification or denial signal from the latter computer and for enabling operation of the game in the event of receiving the credit verification signal, apparatus for transmitting the score signals to the central computers, whereat the scores can be compared and a winning score can be computed, apparatus at the games for receiving signals from the computer representative of the winning score resulting from the scores and/or announcement displays, and apparatus for displaying the winning score and/or announcement displays at all the games.

More generally, another embodiment of the invention is an electronic tournament system comprising a plurality of games of skill including apparatus for generating signals representative of scores resulting from the games, apparatus for displaying the scores locally at the games, apparatus for transmitting the score signals to a central computer, whereat the scores can be compared and a winning score can be computed, apparatus at the games for receiving signals from the computer representative of the winning score resulting from the scores and/or announcement displays, apparatus for displaying the winning score, and/or announcement displays, at all of said games.

Another embodiment of the invention is a tournament system comprising a plurality of games, a central computer linked to the games for receiving scores achieved on the games by a player, apparatus for storing a handicap value relating to players of the games at the central computer, apparatus at the games for transmitting a player identification signal to the computer, whereby scores achieved on the games can be modified at the central computer by the handicap value associated with the player playing the games to produce a resultant score.

Another embodiment of the invention is a tournament system comprising a plurality of games of different kinds, apparatus for storing a handicap value relating to the kind of game relative to other ones of the games at either of the games or the central computer, a central computer linked to the games for receiving scores achieved on the games, whereby scores achieved on the games can be determined and modified by the handicap value associated with each of the games.

Another embodiment of the invention is a tournament system comprising an electronic game including an internal memory for storing at least score data signals relating to scores achieved on the game, at predetermined memory locations, a data link to a central computer, apparatus for reading the score data stored at the predetermined memory locations, and apparatus for transmitting the score data to the data link for transmission to the central computer.

Another embodiment of the invention is an electronic tournament system comprising a plurality of electronic games each including game processor apparatus, a game data bus, a game address bus, and a game memory for storing score data appearing on the data bus at addresses specified by data appearing on the address bus, an interface circuit associated with each game comprising interface memory apparatus having address and data ports, an interface address bus connected between the address port and the game address bus, an interface data bus connected between the data port and the game data bus, whereby data stored in the game memory can be similarly stored in the interface memory apparatus, a communication port, apparatus for reading the data stored in the game memory to obtain score data and for transmitting the score data to the communication port, a central processor, and a central computer including apparatus for communication with the interface circuits via the communication port, for transmitting polling signals to the interface circuit and thereby initiating the transmission of score data for reception to the central computer.

Another embodiment of the invention is an electronic tournament system comprising a plurality of central computers, a plurality of games of skill each including apparatus for generating signals representative of scores resulting from the games and for displaying the scores on a display, each game including apparatus for transmitting the score signals to one of the central computers, whereby groups of the games are associated with each central computer, the central computers being adapted to determine winning scores from each group of games, and apparatus at each of the games for receiving signals from the central computers associated therewith representative of winning score announcements for display thereof on local displays.

BRIEF DESCRIPTION OF THE DRAWINGS

These and other embodiments will be described, and a better understanding of the invention will be obtained by reference to the detailed description below, in conjunction with the following drawings, in which.

DETAILED DESCRIPTION OF THE EMBODIMENTS OF THE INVENTION

Figure 1:
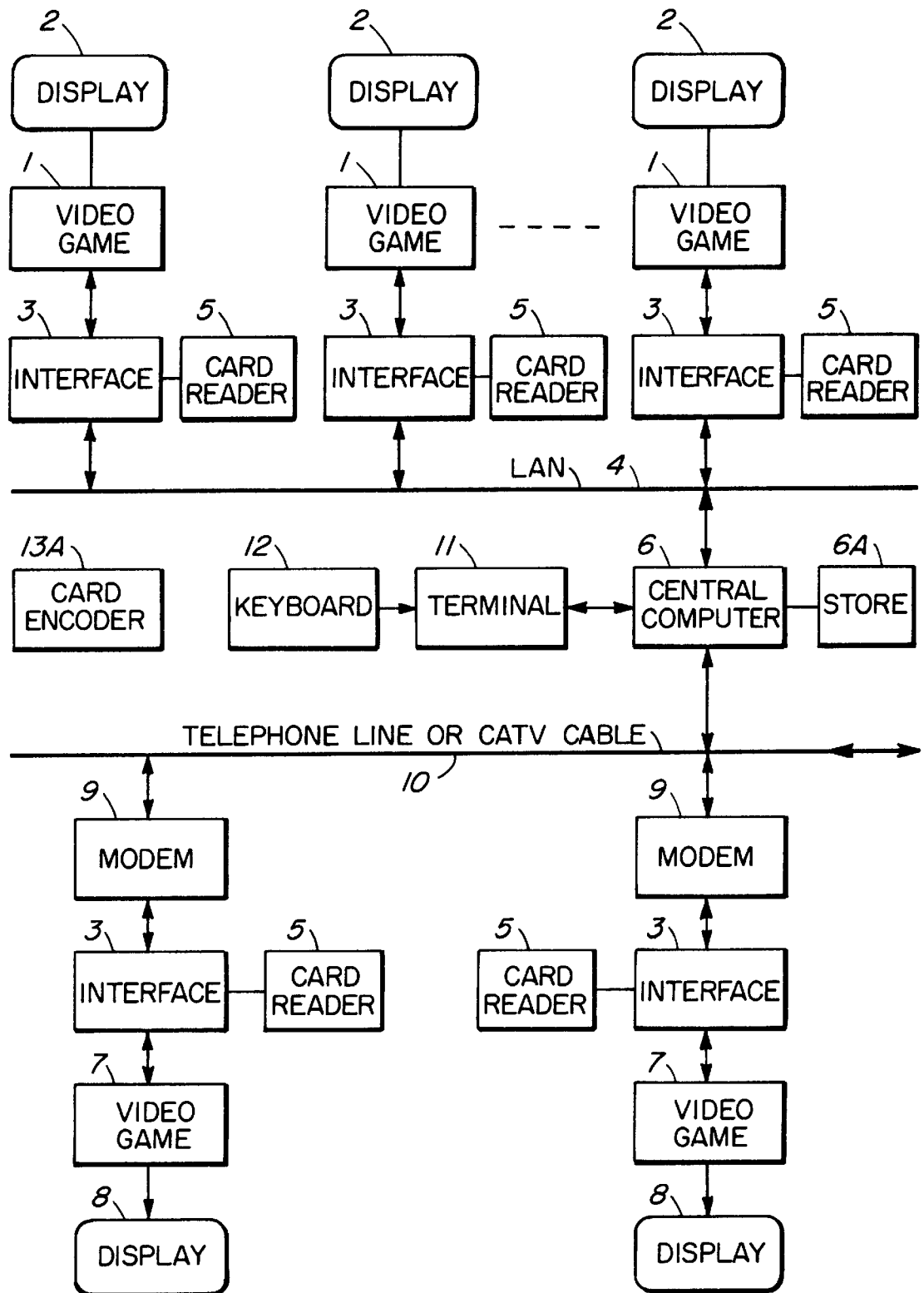
FIG. 1 is a block diagram of a basic tournament system according to the invention.

Turning first to FIG. 1, a plurality of video games such as those which include game displays 2 are located relatively close to each other, e.g. in a single building. A special interface 3 as will be described below connects the video games 1 to a data link, e.g. a local area network 4. Associated with each interface 3 is a card reader 5, preferably a magnetic stripe card reader.

A central computer 6 interfaces with the local area network 4, and thus can communicate with each interface 3.

The system can be as basic as that just described or can include one or more remote video games 7 each preferably having a game display 8. In this case the same interface 3 as previously described is connected to video game 7, but rather than being connected to local area network 4, the interfaces are connected through MODEMs 9 to telephone lines or other long data links such as time or frequency shared CATV cable 10. The central computer 6 is connected to the data link, i.e. telephone line or CATV cable via its own MODEM, via a two-way videotext channel for example.

In addition, a remote terminal 11, having a keyboard 12 connected thereto is connected to the central computer 6. The terminal 11 can be one merely having limited memory, utilizing memory of the central computer 6, or can be a so-called smart terminal, containing its own substantial memory and processing power. Alternatively in some instances it may be desirable to have the terminal 11 with keyboard 12 connected to the central computer by telephone line, CATV cable or other data link.

The tournament system operates as follows. Persons wishing to take part in the tournament purchase credits from an attendant who operates terminal 11. The attendant assigns a different number to each participant, and encodes a magnetic stripe on a credit card with the assigned number, by means of a card encoder 13A, and gives the card having the assigned numbers to each participant. The attendant enters the numbers into terminal 11 via keyboard 12 as well as the amount of credit. It should be noted that the amount of credit for each participant need not be identical, and can be either an actual money value or can be specific games units, depending on how it is desired to set up the system. Use of actual money value can facilitate the players playing games having different playing cost values. In the case of game units, this assumes that each of the games has the same or a multiple thereof playing value. In the case of use of money credit in particular, this also facilitates assigning different game cost, the higher in the tournament the player may be playing, i.e. which can coincide with prize value, etc.

Some of the players may already have had numbers assigned from previous tournaments, and may already have some credits remaining. In this case the attendant need merely key in the player's number into keyboard 12 with whatever the player would like to add to his previous credits.

Assuming that the terminal 11 is a so-called "dumb" terminal, without having substantial storage ability, the player numbers and credit values are transmitted from keyboard 12 via terminal 11 to central computer 6 for storage. Central computer 6 stores the credits associated with the player numbers in a local memory, preferably a hard disc drive 6A. Alternatively, the system can be set up whereby terminal 11 itself stores the player number and credit values. The present description will however be directed to the case in which the central computer 6 stores the just-described data, but it will become clear to a person skilled in the art how the system will operate with storage at terminal 11.

The players now disperse to the various video games, which can be those connected to the local area network 4, and indeed could be located at various places in the city or country accessible by telephone line, for example, to telephone computer 6. It should be noted that since telephone lines are accessible virtually anywhere in the world, a game can be connected to central computer 6 from virtually any location. Therefore a person can play in the local tournament from virtually anywhere in the world. It should also be noted that all players of the tournament need not play the games simultaneously.

The players enter their credit cards into card readers 5. Alternatively, password codes can be entered on interface keyboards. This activates interfaces 3 which, in the case of being connected to local area network 4, each applies a player credit enquiry signal with the player number, and the local video game identification number, to central computer 6 via local area network 4, which usually operates in a well known manner transmitting packets of data.

In the case of each remote video game, interface 3 activates MODEM 9, automatically dialling central computer 6 over the telephone line, gaining access to a bidirectional port associated with the central computer therein. In the case of a CATV cable, the equivalent can be done by data packet channel acquisition, for example.

Central computer 6 receiving data packets from each of the interfaces containing at least video game numeric drop identification data (i.e. address) and player number data searches its memory for the player codes and associated credit data. Assuming that it finds sufficient game credits associated with the value of the game which is to be played by a particular player, it decrements the stored credit data associated with the specific stored player identification code and sends a "game start" signal addressed to the video game address identified by the video game code previously sent to the central computer. The addressed video game, detecting the address at interface 3, receives the "game start" signal, and applies a signal to the associated video game 1 to initiate the game start sequence. The display 2 displays the beginning of the game.

It should be noted that the central computer 6 can send messages in addition to "game start" message to the video games. For example in the case of a tournament it can transmit data signals to each of the video games to display an announcement, for example, the participation of the immediately following game in a specific tournament. The central computer can also read a menu or other similar display allowing the player to select a function by pushing a key on the interface keyboard. Since the messages are sent individually to the various video games, there is no need for each of the games to start simultaneously although they can be started simultaneously if desired. Thus it can be predetermined that, for example, all games which are accessed via credit card within the morning of a particular day would participate in the tournament. Each time a game is to be started on any of the video and displayed on display 2. Yet players not wishing to participate in the tournament can utilize the video games using coin start (for those games having a coin start facility), which will not initiate activation of the central computer. In the case of a game having a coin start, the coin switches can be monitored by the interface whereby a debit card player can add to his credits by inserting coins into the game coin slots.

It should also be noted that with various systems such as just described located at various places across the country (or indeed across the world), a single tournament can be played in various time zones at different times. What is necessary is that the local central computer 6 should recognize that the score data relates to a particular tournament, and if desired, download announcement messages.

Now assuming that the video games have been started, at different times, by means of recognition of the player identification card, the player plays the game. The score data is stored in interface 3 as it increments. At the end of the game the final score is stored in interface 3 along with data which indicates the end of the game (referred to herein as "game over" code), which exactly mirrors the similar score and normally stored in video game 1. Central computer 6 continuously polls the interfaces 3 and eventually detects the "game over" code with the associated score. This score is received by central computer 6 and is stored associated with the player code (which may be modified by his personal handicap and/or the game handicap).

At the end of the time of the tournament the attendant keys a "tournament over" code into keyboard 12, which is transmitted via terminal 11 into computer 6. Alternatively the central computer can cause each game to utilize an internal software timer to determine the end of each game, (or if desired, could count games played and determine the end of the tournament based on the number played). The central computer sorts the scores identifying the player number (and player name if previously stored with the code), and determines the winner. Central computer 6 then initiates transmission of a winner announcement signal to each of the video games. The interface circuit at each of the vide games stores the announcement signal for display on the video game as soon as the associated game becomes idle. The announcement signal can include, for example, the name or player identification code of the player who has won, and other associated announcements, such as the rank of the tournament, the game which was played, the date and time of the next tournament, point or prize value, instructions as to how prizes are to be awarded, any advertising, or the like. Such announcements can be repeated for predetermined periods of time, whenever the local video games become idle. Indeed, it will be seen that the present invention facilitates cutting off operation of the game, and substituting a display downloaded from the central computer.

It is important to recognize that the video games 1 (which will be considered below to include an associated display 2 if it utilizes such display) need not be identical. Since each kind of the video games is identifiable by means of a code, central computer 6 (or other computer in the network to be described below) can store an indicator of what each video game actually is, both specifically, and in terms of handicap value. Indeed, a regional or national computer (to be described later with reference to FIG. 2) could store and download the handicap values to the central computer 6. The handicap values can be associated both with the play difficulty of the video game relative to other kinds of games, and of the play level of difficulty as between similar games, and can be varied with experience of scores achieved on a particular kind of game in particular localities. Thus when a score is received at central computer 6, it can be modified in any one or more of three ways, the first by the kind of game, the second by play difficulty of that kind of game, and the third by the handicap previously assigned to the player. Since both the player number and his previous handicap level and also the above-described factors associated with each game are stored at the central computer, the central computer can automatically assign an equivalent score value different from the actual score received for each game played by each specific player. This facilitates players of widely differing abilities to play on various kinds of video games in a single tournament with an approximate equal degree of fairness. Further, since participants in the tournament are identified by means of the debit cards inserted in the card readers or password code keyed into the interface, only those players who have requested to be entered in the tournament and have prepaid for their games are actually counted in the tournament while video games operated only by coin insertion are not counted in the tournament. Alternatively, a player identified by a debit card or password code can add to his credits by inserting coins into the game coin slots. Further, since each player in the tournament has been allocated a number which is individual to him, and, preferably, his name has been entered into the central computer 6 as well by the attendant, that player entering his card into the video game of his choice to enter the tournament raises the certainty level to a very high degree that the actual player playing the tournament is the one which is assumed to be playing. All the games of the tournament clearly need not be played simultaneously. Since the scores are incremented automatically by the game, the entry of fraudulent scores is substantially avoided.

Figure 2:
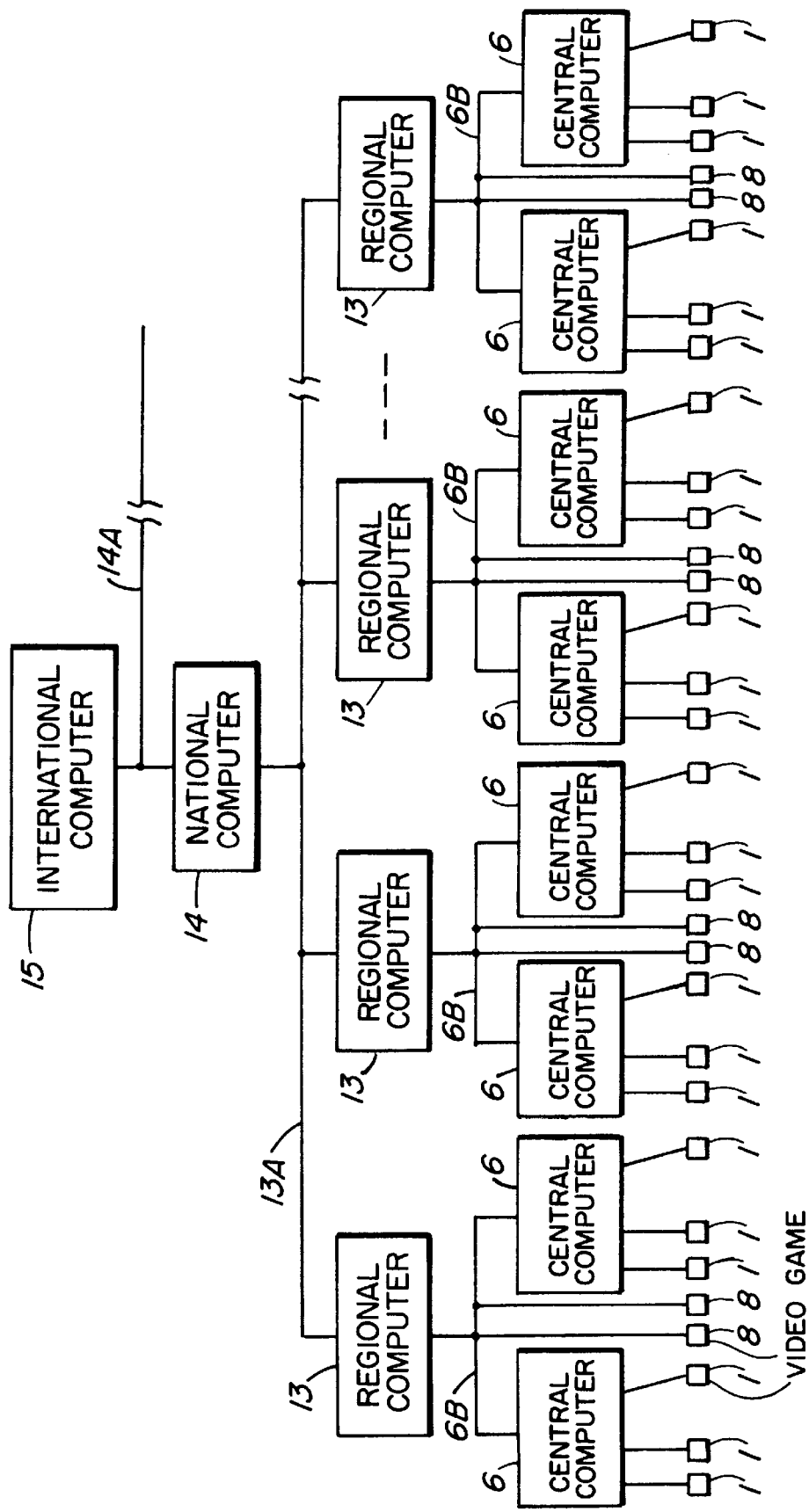
FIG. 2 is a block diagram of a large tournament system according to the invention.

The system shown in FIG. 1 is usefully deployed where the data link or local area network connect to video games at a central location, such as in an arcade, with the remote video games 7 connected to that arcade via local telephone lines or a CATV cable. FIG. 2 depicts a block diagram of another embodiment of the tournament system in which a plurality of such local systems are interconnected into a national or international system. As shown in FIG. 2, a plurality of central computers 6 each have a plurality of video games 1 connected thereto as described with reference to FIG. 1 (the interface circuits being present but are not shown in FIG. 2 for the sake of clarity. Groups of local central computers 6 are connected via a data network 6A to regional computers 13. Connection of the central computers 6 with the regional computers 13 can be by means of a data network such as TYMNET, DATAPAC, or some other X.25 or other protocol packet switching network or the like which can transmit bidirectionally between computers.

Groups of regional computers 13 are connected via a packet switched network 13A to national computer 14. In this way hierarchies of computers access higher and lower level groups of computers to set up national tournament networks. Indeed, national tournament networks can be connected via a similar type of network 14A to a single international computer 15 to facilitate international tournaments.

In operation, the regional computers 13 poll the local central computers 6 for best score (modified by handicaps, etc. as noted earlier) and associated player identification data. The national computer 14 polls the regional computers 13 for similar data, while in the case of an international tournament the international computer 15 polls the national computers 14 for the similar data. Such hierarchies of computers can be similar to those which presently exist for storage and transmission of electronic mail such as the MCI electronic mail network.

The international, national, and regional computers also initiate and download regional, national or international notices for eventual transmission to the local video games.

As an example of operation, tournaments could be held over a period of days, weeks or months at the local central computer level at hundreds or thousands of locations across the country or the world. By this means players are handicapped, the resulting handicap data being stored preferably in the central computers 6. At a later time, regional tournaments would be held whereby those wishing to participate play on their local video games, but this time the central computers 6 are polled by means of the regional computers 13. While the player numbers, handicaps and high scores are retained at the central computer level 6, each of the central computers 6 is polled by the associated regional computer, which calculates by means of comparison of handicap scores modified by the game skill level, which player number, at which specific game, is declared the winner. Preformatted messages, in which the player numbers and names, arcade or central computer identification etc. are inserted are automatically downloaded from central computer 13 to central computers 6 for downloading to video games 1, are either initiated at a particular time, or are manually initiated, thereby facilitating identification, and declaration by means of a broadcast to all video games in the local area that a local winner has been determined. Such a tournament might be citywide, for example.

By a similar technique the national computer 14 polls the scores, player identification numbers, etc. from the regional computers 13 in the case of a national tournament. In the case of an international tournament, the national computers 14 are polled from the international computer. Of course the time established for declaration of a winner must be determined keeping the time zone and convenient time of play in mind, which is particularly important in the case of international tournaments.

However the above system clearly facilitates universal access to a tournament by players of varying skill, on different kinds of games, located in widely different locations, which can be either associated with local video game arcades or located remotely from the local arcades and are connected thereto by telephone line.

Figure 3:
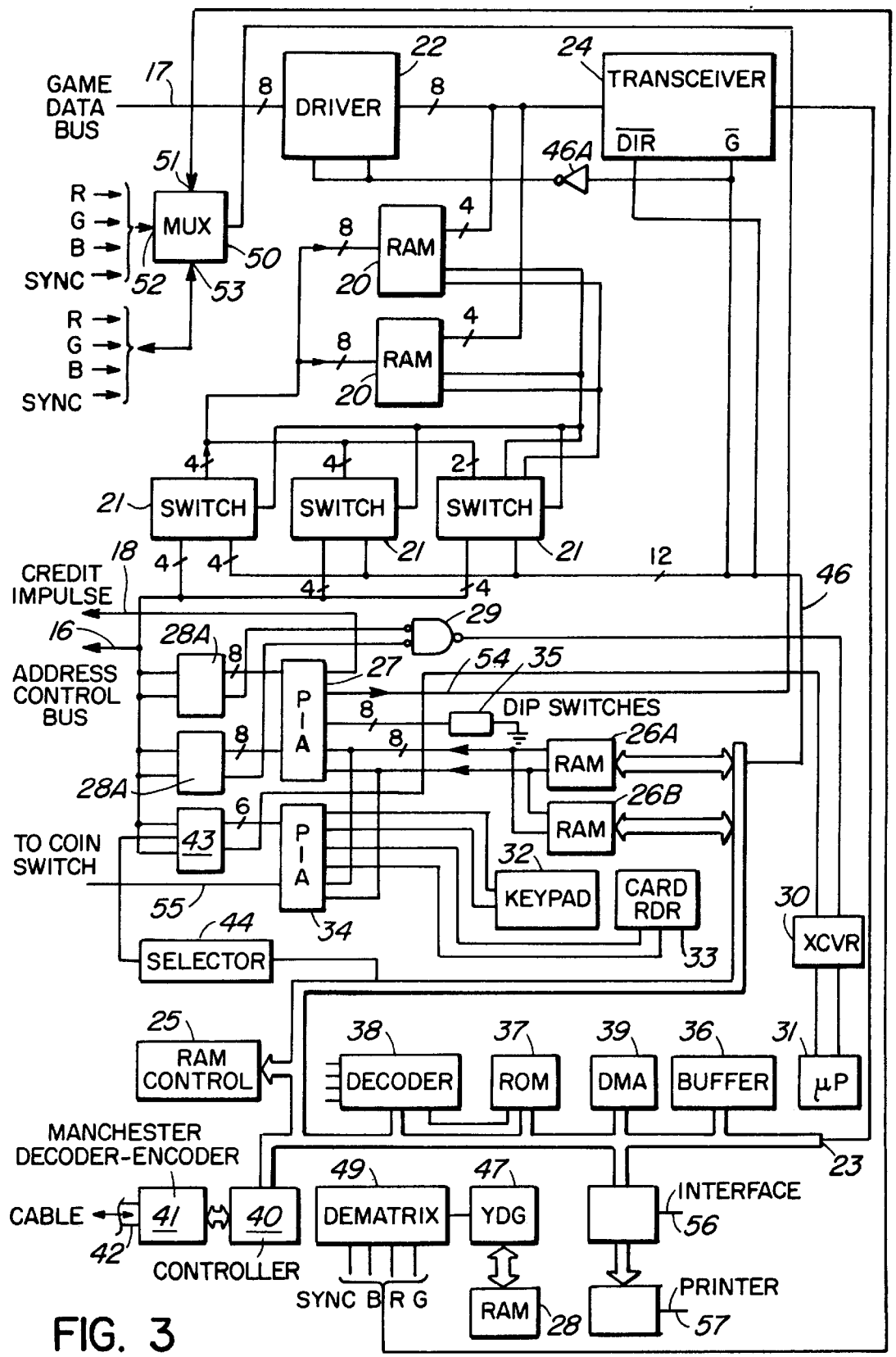
FIG. 3 is a block diagram of the video game interface according to the preferred embodiment of the invention.

The above system is facilitated by the use of a universal interface for the video games, a block diagram of which is shown in FIG. 3. As was mentioned earlier, such an interface is possible since it is found that video games (the definition of which is deemed to include electronically operated pinball machines or other games which transmit their data via internal buses) contain three general kinds of internal parallel buses: an address and control bus 16, a data bus 17, and a start line 18. A pulse on the start line 18 normally initiates operation of the machine. Normally in such machines this pulse is generated upon the machine coin accepter recognizing receipt of the appropriate value of deposited coins, or upon initiation by a reset button if free games are to be allocated or by a service man.

The address and control bus carries data common to microprocessor-memory operated apparatus, such as address information as to where data is to be stored in the memory. The data bus carries data to be stored in a local memory such as score signals, etc. These main buses 16, 17 and 18 as well as the video control bus for games which utilize a video display are accessed by the interface via one or more multi-pin connectors.

It has been found that each such game stores its score and other data in a local random access memory in similar locations as other games of the same model, to facilitate mass production of such games. A map of the memory is obtained either by decoding the memory or by obtaining information as to the storage locations from the game manufacturer. An overlay of the game data storage locations is stored in a random access memory (RAM) 26A of the present invention. In other words, data is stored in RAM 26A as to the meaning of the data stored at particular memory locations in the video game memory. As an example, data may be stored in RAM 26A indicating that at address 1000 in the local video game, storage of a "1" means that a game has begun. Other memory locations in RAM 26A indicate that score data is stored in the game memory at particular locations. The storage of this kind of information for each type of game is important to the operation of this interface. For example, for a national or international tournament, there could be hundreds or thousands of the same kind of game, and consequently as long as those games store information in the same internal memory locations, the same information for each associated interface can be stored in RAM 26A.

Indeed, when configuring the interfaces associated with each arcade or group of video games associated with a single central computer at the time of power-up, the information to be stored in RAM 26A can be downloaded from the central computer into RAM 26A. In this way the interfaces can be moved from game to game as desired, and on powering up when the arcade opens, or at other intervals, the specific game information associated with particular games can be easily allocated to the associated proper games from the central computer. Alternatively RAM 26A can be formed of firmware, and plugged into the interface.

The address ports of one or a plurality of random access memories 20 are connected to the address and control bus through bus switches 21. The game data bus 17 is connected to the data ports of the random access memory 20 via bidirectional driver 22. Thus it may be seen that with switches 21 connecting the address ports of RAM 20 to address bus 16, the game data is stored in RAM 20 at the addresses specified by normal operation of the video game. Thus RAM 20 stores continuously updated data exactly mirroring the data stored in the local memory of the video game to which the interface is connected.

Switch 21 can alternatively connect the address lines portion of the main bus 23 of the interface to the address ports of RAM 20. In that case, however, a write enable input from the address and control bus 16 is lost, and the data stored at the address memory locations in RAM 20 are read out via a tri-state transceiver 24 to the data lines portion of bus 23. Thus signals received by the address inputs of RAM 20 from bus 23, without its write enable input enabled, specify which memory locations are to be read out to bus 23 via transceiver 24.

The data appearing on address and control bus 16 also includes signals relating to confirmation of the start of the game, which can be used to define the end of the game (i.e. that the count of "men" or tries has been decremented to zero) signals, and other such supervisory and controlling information. Forms of these signals are loaded under control of RAM controller 25 from RAMs 26, where the signal form was previously stored, through peripheral interface adapter 27, into digital comparators 28A. The other inputs of comparators 28 are connected to address and control bus 16. Therefore the comparators 28A continuously compare and thus monitor the form of the data appearing on the address and control bus 16 to find a match for such signals as "end of game". As soon as the match is found in the comparators, the $\overline{CE}$ leads of comparators 28A go to low level, and being connected to corresponding inputs of a NAND gate 29, cause an output signal to be applied to a tri-state transceiver 30, which generates an interrupt signal to a microprocessor 31. In this manner signals such as "end of game" can cause the microprocessor 31 to initiate a software routine which enables switch 21 to switch, and thus to carry signals from bus 23 which are address data for reading the data stored in RAM 20. The locations are stored in RAM 26A which are output under control of microprocessor 31. The result is the placing of the score data onto bus 23. The score data can then be stored in a different portion of RAM 26A.

A keypad 32 and a magnetic card reader 33 are connected to inputs of peripheral interface adapter 34. An array of DIP switches 35 is connected to peripheral interface adapter 27. If the coin switches of the game are to be monitored, lines connected to them are connected to inputs of peripheral interface adapter 34.

The microprocessor 31 is connected to bus 23 via a buffer 36. Also connected to bus 23 is a read only memory 37 containing firmware for bootstrap starting the operation of the microprocessor, address decoder 38, and interface to the data link to the central computer. Assuming that the local area network referred to earlier is ETHERNET standard, the data link interface will be comprised of a direct memory access 39, and ETHERNET controller 40, and a Manchester coder-decoder 41 connected to the ETHERNET controller, and to a local area network cable 42. However ETHERNET need not be used; any suitable data link can be used, such as a multidrop line or one conforming to the standard RS485.

In case ETHERNET is used, operation of the ETHERNET controller 40 and Manchester decoder 41 between cable 42 and bus 23 is well known, and information relating thereto can be obtained from Xerox Corporation. The ETHERNET controller can be part number 8003, and the Manchester coder-decoder can be part number 8002. Operation of the microprocessor 31, buffer 36, boot ROM 37, direct memory access 39, RAM 26A, address decoder 38, means for creating interrupts to microprocessor 31, RAM controller 25 and random accessor memory 26B as a system is also known to persons skilled in the art and an explanation thereof can be obtained from the book MICROCOMPUTER PRIMER by Mitchell Waite and Michael Pardee, available from Howard W. Sams & Co. Inc. The magnetic card reader may be obtained from Omron Corp. A successful prototype of this invention was made using type 68BO9 for microprocessor 31, type 244 for buffer 36, type 2716 for boot ROM, type 245 for tri-state transceiver 30, types 138 and 139 for address decoders, type 4500 for dynamic RAM controller 25, and type 4416 for dynamic RAMs 26A and 26B. RAMs 26A and 26B can be combined into one RAM.

The description of operation herein will thus constitute an algorithm in descriptive form from which the software by which microprocessor 31 can control the circuit can be designed. Since software can take many forms depending on the microprocessor which is used, it is believed most helpful to a person skilled in the art understanding this invention to describe the operation from which the flow chart as well as the associated code can be written.

The system described above is connected via the data link to a central computer 6 as described earlier.

It will be assumed that the central computer 6 is waiting for the various video games initially to turn on. Assuming that a video game has been powered up, either simultaneously or later the subject interface circuit is powered up.

The bootstrap firmware stored in ROM 37 now causes the microprocessor 31 to interrogate RAM 26A to obtain the values of DIP switches 35 and the keypad 32 which are connected via the peripheral interface adapters 27 and 34 respectively from bus 23. The DIP switches 35 are previously set to identify uniquely the associated video game, and can be of the form of an eight digit binary code, which is locally stored in RAM 26A. The operator then will key a code into keypad 32 (or can key the code in at the central computer 6) which identifies the form of the game, e.g. representing PACMAN™, SARGON II™ etc. This code should be common for similar kinds of games throughout the local system, and preferably should also be common throughout the system.

The unique game and "kind of game" data are transmitted via the peripheral interface adapters to the bus 23 from which they are transmitted to the central computer 6 after storage in RAM 26A, upon polling from the central computer as described below.

Initially the corresponding DIP switch code values are stored on a floppy or hard disc store 6A at the central computer 6 (FIG. 1), which identifies each of the games. These codes are used as addresses from the central computer to facilitate sequential polling each of the interfaces via the data link network. The code value of the DIP switches is applied from the DIP switches to the peripheral interface adapter 27, and is stored in a RAM 26A. Upon polling from the central computer, the stored DIP swiitch value is compared with the address sent from the central computer by software control in the microprocessor 31. An indication is generated as a result and transmitted to the central computer upon polling by the local central computer indicating that the local interface has been powered up.

As noted earlier, the operator then keys in upon keypad 32 a code identifying the kind of game, which is unique to all of the same games connected to the local area network, or preferably, in the tournament. This code is passed through peripheral interface adapter 34 and is stored in digital comparator 43. As the local interface is polled, the data as to the kind of game is keyed in is transmitted to bus 23 and through the local area network via data link 42 to the central computer. Therefore the central computer is enabled to store the "kind of game" information associated with the number which identifies the game. The above is important in the case in which the kind of game which is provided in the video game is able to be changed from the central computer. According to a further embodiment, the program as to the kind of game to be played can be downloaded from the central computer 6 for transmission to an addressed interface in order to change the kind of game which is played, or the difficulty of the resident game (i.e. its speed, etc.).

Alternatively the "kind of game" code can be entered at the central computer 6.

With receipt of the kind of game code and numeric identification of the interface (which constitutes a local interface address designation), according to one embodiment of the invention the central computer now transmits data to the local interface for storage in RAM 26A, relating to the memory 20 address locations for the scores and other data received from the game relating to the kind of game which was identified. It should be noted that such data can be downloaded from the central computer via the local area network for storage in RAM 26A, or alternatively, RAM 26A could be constituted by firmware which contains the required data or indeed can be downloaded from a local memory transfer device which can be locally connected to bus 23 for entering data into RAM 26A.

The local interface circuit has now been initialized and is ready for play. As described earlier, a player obtains a credit card with his unique number recorded on it from an attendant, who has stored game credits associated with each player number in central computer 6. This player now introduces his card into the magnetic card reader 33, which reads his player number, passes it through peripheral interface adapter 34 into digital comparator 43, which applies the data via selector 44 to data bus 23. This data is stored in RAM 26A, and is read out to central computer 6 via data link, e.g. via the ETHERNET controller, decoder/encoder 41 and cable 42, to central computer 6.

At central computer 6 a check is made for the existence of the player code and of the existence of credits. If both exist, the credit is decremented by the value of one game, and a "start" signal is returned via the local area network to bus 23, from which it is stored in RAM 26A. The signal is passed via RAM 26 to the peripheral interface adapter 34 which applies a credit pulse to credit pulse lead 18. The pulse applied is of the form which is generated in the video game machine when a coin start is initiated. The game is now started under control of the software resident in the video game.

Data now applied to bus 23 under control of microprocessor 31 is carried by lead 46 to the control input of switch 21 and causes switch 21 to connect address and control bus 16 to the address inputs of RAM 20. The address and control data which appears on the address and control bus of the video game passes through switch 21 to the address ports of RAM 20, thus causing data which is presented to RAM 20 to be stored at the designated address locations.

The score and display data signals appear on the data bus 17 of the video game and are thus transmitted via bidirectional driver 22 into the address locations in RAM 20 specified by the addresses received on the address and control bus 16. The bidirectional driver 22 is enabled to transmit the data signals for storage in RAM 20 via signals controlled by microprocessor 31 placed on the bus 23 carried by lead 46A. Thus as the game continues, all of the score data is continuously stored and updated in RAM 20. It will be recalled that the storage locations in RAM 20 of the score and other data have previously been stored in RAM 26A.

When the game has been completed, a code signal or signals identifying the end of the game appears on the address and control bus 16 from the video game. This can be for example the decremented value of game "men" or attempts, or the like. This signal is identified in comparators 28A, which had stored therein the predetermined code signals designating "end of game" which were initially downloaded into RAM 26A. As described earlier, this causes a "match" signal to be applied to NAND gate 29, which generates an interrupt signal to microprocessor 31, upon passing through tristate transceiver 30. At this point under control of microprocessor 31 a signal is applied to switches 21 via bus 23 and lead 46 to switch switches 21 in order to allow RAM 20 to receive address signals from bus 23 instead of from bus 16. The data now applied to bus 23 under control of microprocessor 31 relates both to the addresses of the data to be read from RAM 20 (i.e. the total score value) obtained from the memory overlay data stored in RAM 19, the inversion of a "write enable" signal previously applied to the $\overline{WE}$ inputs of RAM 20, (and chip select data applied to the RAM CS inputs, assuming that RAM 20 is on more than one chip).

As a result, the data stored at the predetermined score locations identified from the data stored in RAM 26A is read out of RAM 20 via tristate transceiver 24 (which is also is connected for control to bus 23), which transmits the data on bus 23 for storage in RAM 26A. Upon the next polling cycle, central computer 6 accesses the score data from RAM 26A which was read from RAM 20, which is transmitted along the data link cable 42 for storage at central computer 6.

Once the game has ended, the local video game shuts itself off in the normal way, and displays on its screen a maintenance sequence to attract players, and is ready for the next player. The central computer, however, continuously polls all of the video games in its network, connected by data link or local area network and by telephone line, storing the scores of various players on different games associated with the player numbers read from the magnetic card reader.

As noted earlier, previous plays may have facilitated allocating a handicap against the player number, which would cause modification of his score. The actual score or value stored can be as varied as might be desired; the score itself can be stored, sequences of scores of various games can be stored, handicap values can be stored, tournament rank can be stored, etc. all associated with the player number and all retained in the memory of the central computer. Either the continuously updated scores, or the final score after detection of the "end of game" signal, can be accessed and stored at the central computer.

Automatically at a predetermined time, after a predetermined number of games played, or upon initiation by an operator, the central computer 6 (or a computer higher upon the network hierarchy which has accessed the noted data)

can be initiated to perform a sort of the handicapped or actual scores, for a determination of the best score. The various techniques for establishing the winner can also be varied, depending on the rules of the tournament. Once the tournament winner has been determined, display data can be transmitted via the local area network, telephone lines, etc. into the local memory, for storage and for local display on the display of the local video game, once it is free of players (idle). This is performed as follows.

A video display generator 47, which has a random access memory 28 connected to it, is connected to bus 23. Signals for displaying on the CRT display of the video game, that is, signals for controlling the red, green, blue and SYNC leads of the video control are downloaded by the data link and video control generator 47 into RAM 28. The output of video display generator 47 is connected to a dematrix 49, which produces corresponding signals on its R, G, B, and SYNC leads. The signals are applied to one input 51 of a multiplexer 50.

The R, G, B and SYNC control leads from the video game are connected to input 52 of multiplexer 51. The output port 53 of multiplexer 51 is connected to the R, G, B and SYNC leads in the video game to which the leads connected to input 52 previously were connected. In other words, R, G, B and SYNC video control leads in the video game are broken and are connected through multiplexer 50.

A video control lead 54 is connected from the peripheral interface adapter 27 to the control input C of multiplexer 50.

In operation, microprocessor 31 controls the switching of the R, G, B and SYNC inputs of multiplexer 50 between those from the game, and those from dematrix 49. When a display has been downloaded in RAM 28 from central computer 6, microprocessor 31 can sense the end of the game as described earlier (or can force the end of the game) by applying a signal via bus 23 and peripheral interface adaptor 27 to apply a control signal on lead 54 to multiplexer 50, to switch so that the R, G, B and SYNC outputs of dematrix 49 pass to output port 53 instead of the R, G, B and SYNC inputs from input 52. End of game signals eventually normally will appear on the bus as if a game had been left unfinished. Microprocessor 31 now controls video display generator 47 which accesses the signals stored in RAM 28 to output the desired display via the desired matrix 49, its R, G, B and SYNC output leads, port 51 of multiplexer 51, output port 53 to R, G, B and SYNC inputs of the video control circuitry of the video game. The interface circuit circuit thus entirely controls the display at the game. Furthermore, the player can interact with the interface circuit by means of pushing buttons in keypad 32.

As an example, according to another embodiment of this invention, when a player has inserted his magnetic card into card reader 33 in order to play a game, once the player's identification code and credit has been verified, rather than generating a credit impulse on lead 18 as described earlier, the central computer can download a display to be displayed on the video game display which constitues a menu. The menu can be, for example, questions concerning the kind of game or tournament to be played. For example the player could be requested to indicate whether the game is to be played for practise, to be played in a tournament, or whether a selection of other kinds of games should be offered. One of the offerings could be the utilization of the video game as a lottery terminal, for example. Another could be whether the video game could be used to receive or send messgages. The player can select the menu choice by pressing one or more keys of keypad 32, which is read by microprocessor 31 as described earlier, and which information is forwarded as data signals to the central computer 6, and which can be transmitted via the network described with respect to FIG. 2 to any other computer or video game.

Assuming that the player selects a menu item by which the kind of game to be played is to be changed, he pushes a button on keypad 32 which is read and transmitted to the central computer as described earlier. The computer downloads signals to control the conversion to another game into RAM 26B. It also downloads the appropriate display signals to be displayed during the game into random access memory 28 via video display generator 47.

A control signal is transmitted to switch 21 to connect its input terminals to bus 23. The address locations in RAM 20 of the game control data are transmitted via bus 23 and switch 21 to the address inputs of RAM 20. At the same time a signal is transmitted to tristate transceiver 24 to change its direction of transmission and to bidirectional driver 22 to place it in its non-transmission mode. The data to be stored in RAM 20, the game control data, is transmitted from RAM 26B via bus 23 through tristate transceiver 24 into RAM 26B at the memory locations specified by the address signals passing through switch 21.

Once the special control data has been stored in RAM 20, under control of microprocessor 31 switch 21 is maintained switched to obtain its control and address information again from address control bus 23, under control of microprocessor 31 and address control signals stored in RAM 26B which were downloaded from central computer 6. This can merely constitute an initial address location and instructions to repeatedly increment addresses up to a predetermined address in unity steps. Driver 22 is switched to transmit data toward bus 17 by control signals received via bus 23. Consequently the address and control data from RAM 26B pass via bus 23, switch 21 to the address ports of RAM 20 to cause readout of the stored data. Since bidirectional driver 22 has also been switched in its opposite transmission direction, the game control data is transmitted from RAM 20 through bidirectional driver 22 to the game data bus 17.

The displays to be displayed on the CRT display of the video game are generated as described earlier by the use of video display generator 47, data stored in random access memory 28, and the use of dematrix 49 and multiplexer 50. The player plays the game by the use of keypad 32.

In the present case the interface circuitry has taken over the function of controlling the game, but utilizing the original game display. In this manner the players can be given a choice of many different kinds of, games; they are not restricted to the use of the game for which the video game was originally designed. Further, the entire apparatus can be used as a local data terminal for other purposes such as sending messages, as a local lottery terminal, etc.

An analogous interface can be made to the game audio circuitry whereby voice synthesized or music announcements can be provided. Further, the coin switches in the coin acceptor mechanism of the video game can be monitored by means of leads 55 which are connected to peripheral interface adaptor 34. As one of the options given on the initial menu the player can be asked whether he wishes to add credits to his credit balance by means of coin insertion. If he selects the appropriate keypad 32 key, the coin switches are monitored by microprocessor 31 via peripheral interface adaptor 34 sensing switch closures.

An interface can also be made to a local printer, for printing point scores, receipts, statements of prizes earned, etc. A printer interface 56 is connected to the bus 23, and also is connected to a printer 57. Data to be printed on printer 57 is loaded from the central computer into RAM 26B as described earlier, and under control of microprocessor 31 passes through printer interface 56 to printer 57, in a manner known in the computer art.

In the above manner the central computer can provide display and audio signals to all of the video games associated with the tournament. Announcements can also be made of forthcoming tournaments, and the central computer can download advertising to the video games, can transmit messages to individual video games, can provide printed prize tickets, etc.

In addition, since the address and control bus of the video game can interact directly with RAM 20, control information for operating different games can be stored in RAM 20, i.e., the specific video game can thus be changed. In this mode of operation, RAM 20 takes the place of the memory in the game, and operates as described above, interacting with the display under control of the control signals on bus 16. In this case the locations of RAM 20 corresponding with those of the memory of the video game which store the game program are loaded by a game program from the central computer. Thus the system provides great versatility, since it can be used as an advertising vehicle, can allow various players of different skills to play different games in competition, and can vary the game which is played. Indeed, specialized games can be designed; each game terminal can be formed into an auction terminal where various "players" compete to purchase an item, and various different games of skill or the like can be used in place of the video games. Purchases or lottery payments can be deducted from the credit balance of the "player" (or terminal operator).

It should be noted that this system can be used to provide many other functions. Since specific games can be downloaded, and since the player's skill level and a handicap relating to the specific game which is chosen is already known, the specific player, identified by his player number can build up a set of scores and handicaps associated with any of the selected games, which is stored at the central computer.

The result of the above facilitates the establishing of a nationwide skill network by means of the arcades and local, regional and national network described above, in which the scores achieved by any player for any game can be compared with the scores of any other within the tournament. Indeed teams of players can be identified by number, their scores kept and compared, establishing a national sport.

In addition the skill level, i.e. ability or time spent, of a participant on an exercise machine, establishing an electronic score signal thereby can also be input into the network, in competition with the skill level of others who establish skill levels on other machines, thus competing in the sport. Such scores can of course be handicapped to distinguish between different kinds of levels of skill required on different kinds of exercise machines, as described earlier. The validation of the machine user/player is of course performed as described above.

Numerous variations to the above invention may now become evident. For example instead of a magnetic card and magnetic card reader, a punched card reader could be used, or entry of a secret numeric code could be used without the use of a card reader at the various games. Rather than using a local area network such as ETHERNET, RS232 or RS422, or other kinds of links can be used between the video games and the central computer. The terminal can also be used to transmit business data to the central computer, such as numbers of games played per machine. Each central computer can transmit data relating to numbers of prepaid sales, number of decrements, sales of other items in the arcade, etc. to the local computer. The local computer can transmit this information up through the hierarchy of computers. In this manner the complete enterprise can be monitored and accurately controlled.

In addition, because the kind of game to be played can be changed at will, its program being downloaded from a central computer linked to each game, players at different games can play interactive games with each other via the data links to the central computer.

In the invention described above the central computers can perform other useful and important functions, such as cash management and accounting, ordering or purchasing of goods displayed on the game display with automatic debiting of an account, seeding of pools, public credit card validation, awarding of free games or other prizes, generation of management reports, transmission of electronic mail messages between computers of the hierarchy (or if the interface is supplied with a keyboard, between electronic games), indication of alarms to remotely located attendants in case of tampering of games, storage of statistical data concerning the total number of games played and the number of games played for cash, disablement of games from a remote location, communication of the status of operation of each game, storage of data and management reports, provision of public messages and displays, etc.

All such variations including the provision of such means within the game are considered to be within the sphere and scope of this invention as defined in the claims appended hereto.

We claim:

1. An electronic tournament system comprising:
   (a) a plurality of games of skill including means for generating signals representative of scores resulting from said games,
   (b) means for displaying said scores locally at said games,
   (c) means for automatically electronically transmitting said score signals to a central computer from said games of skill, whereat said scores can be compared and a winning score can be computed,
   (d) means at said games for automatically receiving signals from said computer, at a time controlled by the computer, representative of the winning score resulting from said scores, and/or announcement displays, and
   (e) means for displaying said winning score, and/or announcement displays, at one or more of said games.

2. A system as defined in claim 1 including computer means for storing player identification data signals and player game credit signals associated with selected player identification data signals, and further including a player identifier reader associated with each of said games for receiving a player identifier, reading said identifier, and forwarding a credit inquiry signal associated with a signal identifying said player resulting from reading said identifier to the latter computer, for receiving a credit verification or denial signal from the latter computer, and for enabling operation of the game in the event of receiving the credit verification signal.

3. A system as defined in claim 2 including one or a plurality of terminals in communication with the latter computer, means at each of the terminals for generating player identification and player credit signals, and for transmitting said identification and credit signals to the latter computer for storage therein.

4. A system as defined in claim 2 or 3, in which the central computer and the computer means are the same computer.

5. A system as defined in claim 2 or 3 in which the player identifier is a card containing player identification indicia stored thereon, the player identifier reader being comprised of a card reader.

6. A system as defined in claim 2 or 3 in which the player identifier is a card on which a magnetic recording stripe is disposed for storing a plurality of data bits representative of a particular player code, the player identifier reader being comprised of a magnetic stripe reader for reading said data bits.

7. A system as defined in claim 1, 2 or 3 in which the games of skill are electronic video games including a display for displaying game graphics, scores generating during normal operation of said game, and said winning scores and/or announcement displays.

8. A system as defined in claim 1, 2 or 3 in which the means for generating signals representative of scores is comprised of an alphanumeric or numeric keypad.

9. A system as defined in claim 1, 2 or 3, in which each of the games includes a bus for carrying game start and game score signals, interface means connected to the bus for receiving said score signals, means for detecting a game start signal on the bus, memory means in the interface means for storing the score signals, means for initiating storage of the score signals upon detection of the game start signal on the bus, and means for transmitting the stored score signals to the central computer upon receiving a polling signal therefrom.

10. A tournament system comprising:
   (a) a plurality of games,
   (b) a central computer linked to said games for automatically receiving from said games scores achieved on said games by a player,
   (c) means for storing handicap values relating to players of said games at said central computer,
   (d) means at said games for transmitting a player identification signal to said computer,
   wherby scores achieved on said games can be modified at the central computer by the handicap value associated with the player playing the games to produce a resultant score.

11. A tournament system comprising:
   (a) a plurality of games of different kinds,
   (b) a central computer linked to said games for automatically electronically receiving from said games scores achieved on said games,
   (c) means for storing handicap values relating to the respective kinds of games at either the games or the central computer,
   whereby scores achieved on said games can be determined modified by the handicap value associated with each of said games.

12. A tournament system as defined in claim 11 including means for storing a handicap value relating to players of said games at said central computer, and means at said games for transmitting a player identification signal to said computer, whereby scores achieved on said different kinds of games can be modified by the handicap values associated with the games as well as the handicap values associated with the identified players to determined resultant scores.

13. A tournament system as defined in claim 10, 11 or 12 in which the scores from said games are automatically received by said central computer by means of a local area data network.

14. A tournament system comprising:
   (a) an electronic game,
   (b) memory means for storing at least score data signals relating to scores achieved on the game, at predetermined memory locations,
   (c) a data link for communication with a central computer,
   (d) means for electronic reading the score data stored at the predetermined memory locations, and
   (e) means for automatically applying the score data to the data link for transmission to the central computer.

15. A tournament system as defined in claim 14 including overlay memory means for storing signals indicative of the storage locations of said scores, and interface processor means for accessing said stored signals indicative of the storage locations of said scores for generating address signals for reading a memory storing said score data signals.

16. A tournament system as defined in claim 15 including means for storing said score data signals in parallel with said memory means, and means for addressing the latter means for storing said score data by means of said address signals.

17. A tournament system as defined in claim 16 whereby the electronic game generates signals indicative of the end of a game, further including means for detecting the end of a game signals and for causing the address signals to be generated and the stored score signals read.

18. A tournament system as defined in claim 17 in which the means for detecting is comprised of a comparator for comparing data signals generated by the game with a predetermined signal indicative of the end of a game.

19. A tournament system as defined in claim 18, the game including an address bus and a data bus connected to an address port and a data port respectively of the memory, and in which the means for storing the score data signals is comprised of a memory having its address port connectable to the address bus of the game and its data bus connectable to the data bus of the game, whereby the means for storing the score data signals is enabled to store signals stored by the memory means in parallel therewith.

20. A tournament as defined in claim 19 including an interface processor address bus to which the overlay memory is connected, means for switching the address input of the means for storing the score data signals to the interface processor address bus for receiving address signals generated under control of said processor.

21. A tournament system as defined in claim 20 including an interface processor data bus, means for switching the data input of the means for storing the score data signals to the interface processor data bus for receiving auxiliary game control data signals under control of the processor means for storage at address locations received via the interface processor address bus.

22. A tournament system as defined in claim 21 including means for receiving said auxiliary game control data signals from said central computer.

23. A tournament system as defined in claim 21 or 22 including means for switching said data and address ports to the data and address buses of said game for transmitting said auxiliary game control data to the data bus for operation of said game under address control of address signals generated under control of the interface processor means and appearing on the interface processor address bus.

24. A tournament system as defined in claim 21 or 22 in which the game control data signals are data comprised of control signals for a different game alternate to that in said former game, including means for switching said data and address ports to the data and address buses of said game for transmitting said control data to the data bus for control of said game, whereby a player of said game is enabled to play said different game.

25. A tournament system as defined in claim 14, 17 or 19 further including a player code identification means for reading a player identification code applied thereto, means for transmitting a code signal related to said player code to the central computer for verification thereof, means for receiving a verification code signal from the central computer and for generating and applying a "game start" pulse to the game upon receipt of the verification code signal whereby play of the game is initiated.

26. A tournament system as defined in claim 14, 17 or 19 further including a magnetic card reader for reading a card containing a magnetically encoded player code thereon, means for transmitting a code signal relating thereto to the central computer for verification thereof, means for receiving a verification code signal from the central computer and for generating and applying a "game start" pulse to the game upon receipt of the verification code whereby play of the game is initiated.

27. An electronic tournament system comprising:
   (a) a plurality of electronic games each including game processor means, a display, a game data bus, a game address bus, and a game memory for storing score data appearing on the data bus at addresses specified by data appearing on the address bus,
   (b) an interface circuit associated with each game comprising:
      (i) interface memory means having address and data ports,
      (ii) an interface address bus connected between the address ports and the game address bus,
      (iii) an interface data bus connected between the data port and the game data bus,
         whereby data stored in the game memory can be similarly stored in the interface memory means,
      (iv) a communication port,
      (v) means for reading the data stored in the interface memory means to obtain score data and for electronically transmitting the score data to the communication port,
      (vi) a central processor,
   (c) a central computer including means for communication with the interface circuits via the communication port, for transmitting polling signals to the interface circuit and thereby initiating said transmission of score data for reception by the central computer.

28. An electronic tournament system as defined in claim 27, in which each interface circuit further includes:
   (vi) a player identification code reader,
   (vii) means for transmitting a player identification code read by the code reader to the associated central computer,
   (viii) means for receiving a player code verification signal from the associated central computer and generating a game start signal, and for transmitting the game start signal to the associated electronic game whereby a player can play a score signal generating game on the electronic game.

29. An electronic tournament system as defined in claim 28 in which each central computer includes means for storage of player identification codes and associated game credits, and for generating and transmitting a player code verification signal to a selected electronic game in the event of reception of a code from said selected electronic game which matches a stored player identification code and the existance of a game credit associated therewith.

30. An electronic tournament system as defined in claim 29 in which each central computer includes means for storage of handicap data associated with one, either or both of player codes and individual games, for receiving game score signals from the associated electronic games, and for selecting a winning game and player based on a predetermined relationship between the game scores and handicaps.

31. An electronic tournament system as defined in claim 27, 28 or 29 in which each interface circuit further includes an overlay memory for storage of pointer signals relating to score addresses of the interface memory where score data for the associated electronic game are stored, means for reading the overlay memory and for converting the pointer signals to said score address signals, means for switching the address port of the interface memory means to receive said score address signals, and means for switching the data port of the interface memory means whereby the score data stored therein may be read for transmission to the central computer.

32. An electronic tournament system as defined in claim 27, 28 or 29 in which each interface circuit further includes an overlay memory for storage of pointer signals relating to score addresses of the interface memory where score data for the associated electronic game are stored, means for reading the overlay memory and for converting the pointer signals to said score address signals, means for switching the address port of the interface memory means to receive said score address signals, comparator means connected to the interface data bus for detecting an "end of game" signal generated by the associated electronic game appearing on its data bus, and in response for signalling the central processor that a game has ended, whereby a data signal is transmitted to the associated central computer indicative thereof.

33. An electronic tournament system as defined in claim 27, 28 or 29 in which each interface circuit further includes an overlay memory for storage of pointer signals relating to score addresses of the interface memory where score data for the associated electronic game are stored, means for reading the overlay memory and for converting the pointer signals to said score address signals, means for switching the address port of the interface memory means to receive said score address signals, comparator means connected to the interface data bus for detecting signals representative of an end of a game generated by the associated electronic game appearing on its data bus, and in response for signalling the central processor that a game has ended, whereby a data signal is transmitted to the associated central computer indicative thereof, means for switching the address and data ports to receive address and data signals for storage of the latter data signals in the interface memory means at addresses specified by the latter address signals, means for storage of said latter address and data signals, and means for switching the interface memory data port to the game data bus to output said data signals thereon and thereby control operation of the electronic game.

34. An electronic tournament system as defined in claim 27, 28 or 29 in which each interface circuit further includes an overlay memory for storage of pointer signals relating to score addresses of the interface memory where score data for the associated electronic game are stored, means for reading the overlay memory and for converting the pointer signals to said score address signals, means for switching the address port of the interface memory means to receive said score address signals, comparator means connected to the interface data bus for detecting signals representative of an end of a game, generated by the associated electronic game appearing on its data bus, and in response for signalling the central processor that a game has ended, whereby a data signal is transmitted to the associated central computer indicative thereof, means for switching the address and data ports to receive address and data signals for storage of the latter data signals in the interface memory means at addresses specified by the latter address signals, means for receiving at least said latter data signals from the associated central computer, means for storage of said latter address and data signals, and means for switching the interface memory data port to the game data bus to output said data signals thereon and thereby control operation of the electronic game.

35. An electronic tournament system comprising:
   (a) a plurality of central computers,
   (b) a plurality of games of skill each including means for generating signals representative of scores resulting from said games and for displaying said scores on a display,
   (c) each game including means for automatically transmitting said score signals to at least one of the central computers, whereby groups of said games are associated with each central computer, said central computers being adapted to determine winning scores from each group of games,
   (d) means at each of said games for automatically receiving signals from the central computers associated therewith representative of winning score announcements, at times controlled by the central computers for display thereof on local displays.

36. An electronic tournament system as defined in claim 35 further including one or a plurality of regional computers with which one or a plurality of groups of central computers can communicate, means for transmission of winning score data signals from the central computers to the one or plurality of regional computers whereby a winning score can be computed and corresponding announcement signals transmitted to the central computers for transmission to and display at the games.

37. An electronic tournament system as defined in claim 36, including means at each central computer for storage of player codes and associated game credits, means at each game for reading cards carrying individual player codes, for transmitting a verification inquiry to an associated central computer, for receiving a verification signal from the associated central computer and in response for initiating operation of said game.

38. An electronic tournament system as defined in claim 37 including means at each central computer for storing handicap data associated with each stored player code, and for determining said winning scores based on a predetermined combination of scores achieved on the initiated games with said handicap data.

39. A tournament system as defined in claim 21 or 22 including means for switching said data ports to the data bus of said game for transmitting said display data to the data bus for display at said game under address control of address signals generated under control of the interface processor from data signals received from the central computer.

40. An electronic tournament system comprising:
   (a) a plurality of games of skill including means for automatically generating signals representative of scores resulting from said games as said games are played,
   (b) means for automatically transmitting signals representative of final scores resulting from said games to a central computer from said games of skill, whereat said scores can be compared and a winning score can be computed.

41. An electronic tournament system as defined in claim 40 including a data bus carrying said score signals and means for automatically transmitting said final score signals upon completion of said games.

42. A tournament system comprising:
   (a) an electronic game for automatically generating score signals as the game is played, and
   (b) means for automatically applying the score signals from the electronic game to a data link port for transmission to a central computer.

43. A tournament system as defined in claim 42 further including means for identifying a player and for applying a player identification signal to said data link port.

44. A tournament system as defined in claim 43 further including means for receiving a player verification signal via the data link port and for enabling the game upon receipt of said verification signal.

45. A tournament system as defined in claim 42 or 43 including keyboard means for generating signals representative of the operation of keys on said keyboard and applying said signals to the data link port whereby command, instruction, score or informational signals are transmitted to the central computer.

46. A tournament system as defined in claim 42 or 43 further including means connected to said game for receiving display signals from the central computer, and for displaying said signals on a display associated with the game.

47. A tournament system as defined in claim 42 or 43 further including means in communication with said game for storing game command signals, and means in communication with said game for storing display signals, a keyboard means, processor means for communication with the storing means and keyboard means for causing operation of a different play and different display on the display of said game upon operation of the keyboard by said player.

48. A tournament system as defined in claim 42 or 43 further including means in communication with said game for storing game command signals, and means in communication with said game for storing display signals, a keyboard means, processor means for communication with the storing means and keyboard means for causing operation of a different play and different display on the display of said game upon operation of the keyboard by said player, and means for receiving a player verification signal via the data link port and for enabling the game upon receipt of said verification signal.

49. A tournament system as defined in claim 21, 41 or 43 further including a first random access memory for storing first display operation signals, a multiplexer, means for applying the first display operation signals to one input port of the multiplexer, means for applying game display operation signals from the game to a second input port of the multiplexer, a processor for enabling the multiplexer to apply either the first display operation signals or the game display operation signals to video display operation circuitry of said game.

50. A tournament system as defined in claim 21, 41 or 43 further including a random access memory for storing score and auxiliary game control signals, a keyboard, a first random access memory for storing first display operation signals, a multiplexer, means for applying the first display operation signals to one input port of the multiplexer, means for applying game display operation signals from the game to a second input port of the multiplexer, a processor for enabling the multiplexer to apply either the first display operation signals or the game display operation signals to video display operation circuitry of said game, and for enabling operation of an auxiliary game in place of the former game upon operation of said keyboard.

51. A tournament system as defined in claim 21, 41 or 43 further including a random access memory for storing score and auxiliary game control signals, a keyboard, a first random access memory for storing first display operation signals, a multiplexer, means for applying the first display operation signals to one input port of the multiplexer, means for applying game display operation signals from the game to a second input port of the multiplexer, a processor for enabling the multiplexer to apply either the first display operation signals or the game display operation signals to video display operation circuitry of said game, and for enabling operation of an auxiliary game in place of the former game upon operation of said keyboard, and means for receiving said auxiliary game control signals and said first display operation signals from said central computer.

52. A tournament system as defined in claim 42 further including means for storing alternate game control signals whereby an alternate game can be played generating alternate scores.

53. A tournament system as defined in claim 52 including means for enabling said alternate game control signals under control of the control computer.

54. A tournament system as defined in claim 42 further including means for storing alternate control and display signals, means for enabling communication with the central computer under control of the alternate control signals and display of an alternate display on the game display under control of the alternate display signals.

55. A method of operating a tournament comprising:
    (a) linking a plurality of games in which scores are automatically generated, to a central computer,
    (b) automatically electronically transmitting at least the final scores from the games to the central computer,
    (c) comparing the final scores from said games at said computer,
    (d) transmitting a display message signal to each of the games for display at said games from the central computer at predetermined instances at times controlled by the central computer.

56. A method of operating a tournament as defined in claim 55 comprising entering individual player codes at each of the games taking part in the tournament, transmitting signals representative of said codes to said computer, comparing the player codes with predetermined codes at said computer, transmitting verification signals from said computer to individual ones of said games in the event corresponding individual ones of the player c odes match said predetermined codes, and enabling said individual ones of said games receiving said verification signal s.

57. A method of operating a tournament as defined in claim 56 including storing handicap data rel at ing to each game game at either of the corresponding game or the central computer, and storing handicap data relating to said players at the central computer, and modifying the scores by either or both of the game and player handicap data prior to comparison of the final scores.

58. A method of operating a tournament comprising:
    (a) linking by means of an electronic transmission path a plurality of games in which scores are automatically generated by the games and displayed on respective local game displays, to a central computer,
    (b) automatically transmitting a display message signal to any or each of the games for display thereby in place of the local display generated by the game at times controlled by the central computer.

59. A method of operating a tournament as defined in claim 55, 56 or 58 including transmitting said display message signal to said central computer from a regional computer.

60. A method of operating a tournament as defined in claim 55, 56 or 58 including generating command instruction or informational signals on keyboards at the games and transmitting them to the central computer for enabling operation thereof in a predetermined manner.

61. A method of operating a tournament as defined in claim 56 or 57 including storing credit signals associated with predetermined ones of said player codes at said central computer, and decrementing individual ones of the credit signals with predetermined values upon receiving said signals representative of individual player codes and matching said received player codes and the stored player codes.

62. A method as defined in claim 55, 56 or 58 including printing a message or ticket at at least a predetermined one of said games for retaining by a player associated with at least said predetermined game.

63. A tournament system as defined in claim 42, 43 or 44 including a printer means at said game for receiving data signals from the data link port for printing a message or ticket thereon in response thereto.

64. A tournament system as defined in claim 14, including means for manually inputting the score data signals into the predetermined memory locations.

65. A tournament system as defined in claim 42 or 44 including means for manually inputting score signals to the applying means for transmission to the central computer.

66. A method as defined in claim 55 or 58 including manually keying the scores on a keyboard whereby they can be transmitted to the central computer.

* * * * *